3,261,693
METHOD OF PREPARING AND FREEZING LOBSTERS AND CRABS
Ruth W. Jung, 75—76 199th St., Flushing, N.Y.
No Drawing. Filed Mar. 5, 1964, Ser. No. 349,743
6 Claims. (Cl. 99—195)

This invention relates to a new and improved method of preparing whole lobsters for freezing for indefinite storage.

It is well known that lobsters are generally cooked alive for the reason that they quickly lose their optimum flavor and tenderness when they are not so cooked. Therefore, great expense is incurred in keeping lobsters alive in the proper environment and transporting them alive. No methods have been found to date successfully storing whole lobsters after they have been killed. The result of this is that lobsters are relatively expensive and unavailable in many places. Many attempts have been made to quick freeze lobsters alive but have not been successful due to the fact that the meat sticks to the outer skin or shell in a very tenacious manner so that it cannot be easily removed without shredding. Also, under such treatment the lobster loses its flavor and the meat decomposes and loses its firm texture.

Attempts have also been made to preserve cooked whole lobsters. But these attempts have not been successful since the lobsters lose their flavor and the meat becomes tasteless and tough.

Some success has been attained in freezing lobster tails which are generally imported from South Africa. However, the American lobster, which is generally procured from the northeastern coast of the United States, is eaten whole since there is good meat in the body portion of the lobster and in the claws.

After much experimentation, I have found that whole lobsters may be successfully prepared for freezing by the following steps:

(1) Quickly paralyzing the nervous system of the lobster by electric shock by inserting a pair of electrodes into the body portion.

(2) Applying the electricity until the lobster becomes immobile and then quickly removing the electrode and placing the lobster into a quick freezing compartment. It is not even necessary to wrap the lobster since the shell and body cover provide a natural seal.

It is believed that slow killing of a lobster such as by placing a live lobster into a freezing compartment, causes the lobster to secrete certain fluids or acids which tend to decompose the meat and to make the meat spongy and tasteless. With my method I paralyze or kill the lobster practically instantaneously, before such action can take place and then the lobster is quick frozen with the meat in good condition. By the use of this process the lobster may be kept for long periods of time and the meat does not freeze unto the shell so that it cannot be easily removed upon normal thawing.

The process is effective by either killing or paralyzing the nervous system with the first shock.

Accordingly, a principal object of the invention is to provide new and improved methods for preserving whole lobster.

Another object of the invention is to provide new and improved methods for freezing whole lobsters.

Another object of the invention is to provide new and improved methods for preparing lobster for storage comprising the steps of quickly paralyzing or killing the nervous system by inserting electrodes into the body portion and applying electricity until the lobster becomes immobile, then quickly removing the electrodes and placing the lobster in a quick freezing compartment.

In one mode of carrying out my invention, two relatively long needle type electrodes are inserted under the shell forward of the tail and forward into the body portion at least half or two-thirds of the way to the forward portion of the shell. The vital organs of the lobster are located in this locality mainly the heart and brain. The two electrodes are inserted along the top underside of the shell spaced apart so that the electricity will pass between them and paralyze these portions of the nervous system or kill the lobster.

In one successful process 110 volts A.C. were applied to the electrodes with a resistance of about 20 ohms. in one lead and the lobster of about 1¼ pounds becomes relaxed and immobile in about 20 seconds. The electrodes were then removed and the lobster placed in a quick freezing compartment. After the lobster has been quick frozen it may be kept in a freezer compartment for a long period of time of at least several months. I have kept lobster prepared by this process for as long as six months with good results.

After the lobster is quickly frozen it may be desirable to put it in a paper or plastic bag so it does not stick together. Suitable moistureproof and vaporproof coatings or protective wrappings may be used to effect interminable frozen storage.

This method of quickly paralyzing or killing the nervous system of the lobster avoids any slow deaths. It is believed that when a lobster undergoes a slow death, it releases an acid or other fluid that decomposes and reduces the meat and makes it tasteless. This is probably the reason why the conventional way to cook lobsters is to put the lobster into boiling water so that they are killed immediately before the fluid can circulate and cause decomposition or any deterioration of the meat.

After the lobster has been frozen according to my method, it may be thawed out in a conventional manner by letting it rest at room temperature for a period of a few hours or it may be thawed in hot water, depending upon the size. If the lobster is thawed out at room temperature, then it may be cooked in conventional manner by boiling or broiling. If the lobster is cooked while it is still frozen, then it is necessary to cook it slightly longer.

I have found that this method may also be used with other shell fish such as crabs.

Another suggested way to quickly paralyze or kill a lobster is by injecting a very low temperature liquid into the upper body adjacent to vital organs for instance, liquid nitrogen or liquid carbon dioxide.

It is possible that other quick shock means may be used for instance, chemical injection, radiation or vibration possibly of the ultra-sonic type to shock or kill the nervous system of the shell fish.

Many modifications may be made by those who desire to practice the invention without departing from the scope thereof which is defined by the following claims.

I claim:
1. The process of preparing lobster for storage comprising the steps of;
   quickly paralyzing or killing the lobster by electric shock by inserting a pair of electrodes into the body portion,
   applying electricity until the lobster becomes immobile and then quickly removing the electrodes and quickly freezing the lobster.

2. The process of preparing lobster for storage comprising the steps of;
   quickly paralyzing or killing the lobster by electric shock by inserting a pair of electrodes into the body portion,
   applying electricity until the lobster becomes immobile and then freezing the lobster.

3. The process of preparing shell fish for storage comprising the steps of;
quickly paralyzing or killing the shell fish by electric shock until the shell fish becomes immobile and then freezing the shell fish.

4. The process of preparing lobster for storage comprising the steps of;
quickly paralyzing the lobster by electric shock,
applying electricity until the lobster becomes immobile and then freezing the lobster.

5. The process of preparing shell fish for storage comprising the steps of;
quickly paralyzing or killing the nervous system of the shell fish by injecting the shell fish with liquid carbon dioxide until the shell fish becomes immobile and then freezing the shell fish.

6. The process of preparing shell fish for storage comprising the steps of;
quickly paralyzing or killing the nervous system of the shell fish by injecting the shell fish with liquid nitrogen until the shell fish becomes immobile and then freezing the shell fish.

References Cited by the Examiner

UNITED STATES PATENTS 2,501,655   3/1950   Altenburg _____ 99—195

A. LOUIS MONACELL, *Primary Examiner.*

L. M. SHAPIRO, *Assistant Examiner.*